United States Patent [19]
Chandler

[11] 3,781,102
[45] Dec. 25, 1973

[54] MODULAR STRUCTURE FOR VIEWING APPARATUS

[75] Inventor: Jasper S. Chandler, Rochester, N.Y.

[73] Assignee: Eastman Kodak Company, Rochester, N.Y.

[22] Filed: Mar. 19, 1971

[21] Appl. No.: 126,216

[52] U.S. Cl............................ 353/26, 353/27, 353/75, 353/78
[51] Int. Cl...................... G03b 23/12, G03b 21/22
[58] Field of Search ................... 353/74, 77, 78, 26, 353/27, 75; 350/104

[56] References Cited
UNITED STATES PATENTS

| | | | |
|---|---|---|---|
| 3,561,860 | 2/1971 | Rudolph | 353/75 |
| 3,535,031 | 10/1970 | Spreitzer | 353/77 |
| 2,174,778 | 10/1939 | Croft | 353/75 |
| 3,040,622 | 6/1962 | Reddle et al. | 352/104 |
| 3,472,585 | 10/1969 | Halberg et al. | 353/27 |

Primary Examiner—Louis R. Prince
Assistant Examiner—Steven L. Stephan
Attorney—Robert W. Hampton, Paul R. Holmes and Lloyd F. Seebach

[57] ABSTRACT

A viewing apparatus comprises at least two or, in some instances, three distinct modules. A base module includes a light source, a condenser lens system, a projection lens system, and a carrier for the type of photographic medium to be viewed, all of which are arranged in said base module. The base module also serves to support a housing module in which one or more mirrors are arranged for directing the projected image onto a front surface screen that is also mounted within the housing module. Filter means is arranged between the screen and a viewing opening in the housing module for compensating for the color temperature of the light source, thereby optimizing the luminance of the projected image reflected by the screen when viewed through the opening by an observer. The filter means also serves to reduce ambient light and is mounted in such a way as to seal the housing module against the entry of dust and dirt from the environs. In addition, the filter means provides a level of light (image luminance) that is suitable and comfortable for extended periods of viewing.

12 Claims, 11 Drawing Figures

JASPER S. CHANDLER
INVENTOR.

BY Lloyd F. Seebach

AGENT

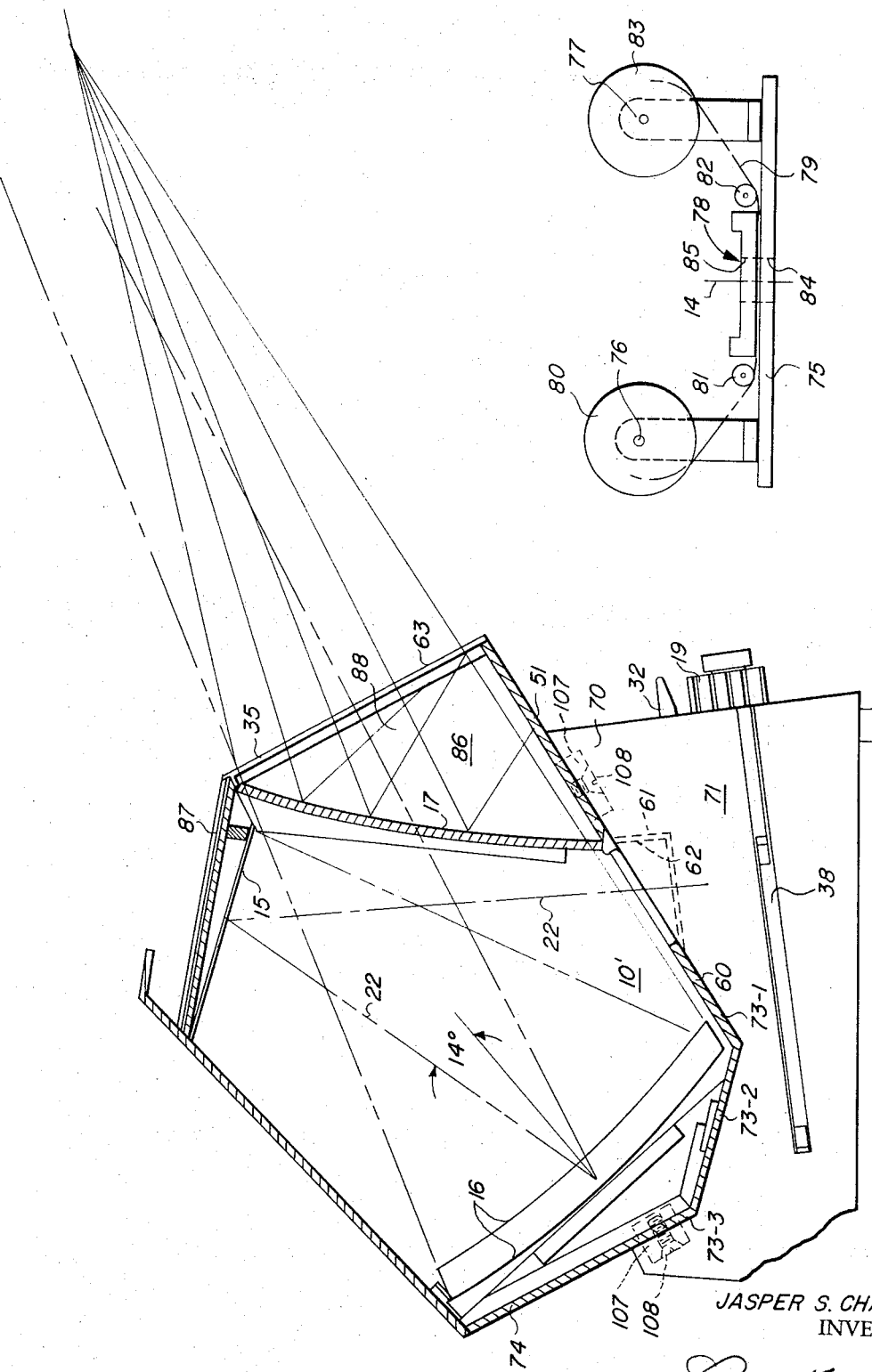

PATENTED DEC 25 1973 3,781,102

JASPER C. CHANDLER
INVENTOR.

BY Lloyd F. Seebach

AGENT

MODULAR STRUCTURE FOR VIEWING APPARATUS

1. Field of the Invention

The present invention relates to photographic apparatus and more particularly, to viewing apparatus for projecting an image carried by a photographic medium onto a front surface screen.

2. Description of the Prior Art

In the prior art, it has been a continual problem to project an image onto the front surface of a reflection type screen or onto the rear surface of a transmission type screen so that the image projected thereon will be of optimum quality and contrast. In addition, many screen structures have been proposed, whereby any ambient light incident on the viewing surface of the screen will be substantially eliminated, so an image of improved quality and contrast can be obtained. Color correction of the projected image has been proposed; for example, by placing a suitable filter in the optical system usually in combination with a condenser lens system. However, such an arrangement reduces the image intensity or brilliance to such an extent that the image contrast is reduced considerably. Such a filter provides no control of any ambient light incident on the viewing surface of the screen. When a front surface screen is used in a viewing device, the housing is provided with an opening or open side through which the image incident on the screen can be viewed. Such a structure lends itself to the accumulation of dust and dirt on the screen, as well as on any of the reflecting members that might be arranged within the housing and forming part of the optical projection system. It will be appreciated that the invention disclosed and described hereinbelow permits one to make a viewing apparatus in which a housing module and a base module can be assembled as a unit that is complete in itself and sealed against dust and dirt from the environs.

Summary of the Invention

One object of the invention is to provide viewing apparatus in which a projected image has optimum contrast and in which the directional properties of the front surface screen provide very high rejection of ambient light.

A further object of the invention is to provide a viewing apparatus in which the luminance of an image projected onto a front surface screen is optimized by viewing through filter means arranged between the screen and an observer.

Another object of the invention is to provide viewing apparatus which is assembled so as to be used with one that readily lends itself to being assembled in a form for use with one of several types of image-bearing media.

Still another object of the invention is to provide a viewing apparatus which is of modular structure, each module containing some part of a complete optical system and being interchangeable so as to permit the viewing apparatus to be used with a particular one of several different forms of photographic media.

Yet another object of the invention is to provide a viewing apparatus of such a modular construction that it can be readily assembled for use with a particular photographic medium with a minimum of cost.

These and other objects and advantages of the invention will be apparent to those skilled in the art by the description which follows.

The objects of the invention are attained by viewing apparatus which comprises at least two or, in some instances, three distinct modules. A base module comprises a light source, a condenser lens system, a projection lens system, and a carrier for the type of photographic medium to be viewed which are arranged in said module. The base module also serves to support a housing module in which one or more mirrors are arranged for directing the projected image onto a front surface screen that is also mounted within the housing module. A filter is arranged between the screen and a viewing opening in the housing module and compensates for the color temperature of the light source, thereby optimizing the luminance of the image reflected by the screen when viewed through the viewing opening. The filter also serves to reject ambient light and is mounted in such a way as to seal the housing module. In addition, the filter provides a level of light (image luminance) that is suitable and comfortable for extended periods of viewing by an observer. Several different embodiments of the viewing apparatus are disclosed in which various structural features are represented. Inasmuch as a high reflectance screen is used in the viewing apparatus, sufficient illumination to provide the desired image luminance can be obtained with a very low wattage lamp that is operated at less than its rated voltage. As a matter of fact, the heat level of such lamp is sufficiently low that a blower is not required for cooling, as is customary in viewing apparatus of this type.

Description of the Drawings

Reference is now made to the accompanying drawings in which like reference characters designate like parts and wherein:

FIG. 6 is a side elevational view of a viewing apparatus similar to that shown in FIG. 1, and in which the housing module is shown in section;

FIG. 7 is a partial perspective view showing the manner in which the housing module and the base module are interconnected for assembling as a unit;

FIG. 9 is a front elevational view showing another embodiment of a carrier for the photographic medium that is usuable in the viewing apparatus shown in FIGS. 1 and 6.

Description of the Preferred Embodiment

Figure 1:
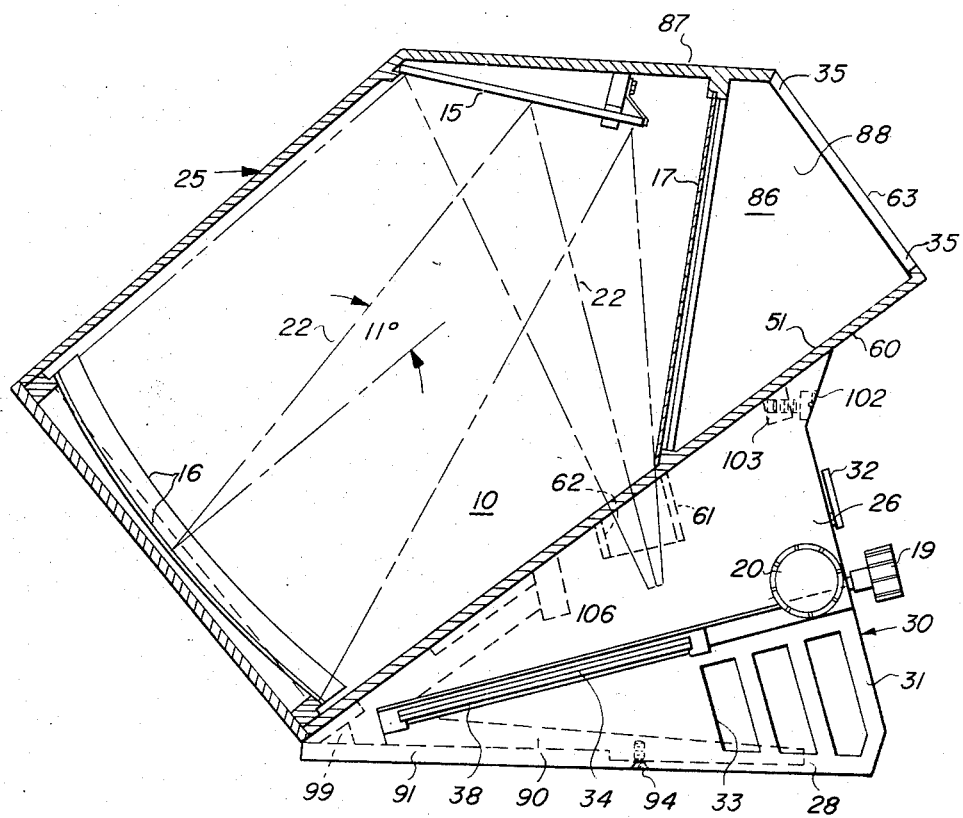
FIG. 1 is a side elevational view of a viewing apparatus in accordance with one embodiment of the invention and in which the housing module is shown in section.
Figure 2:
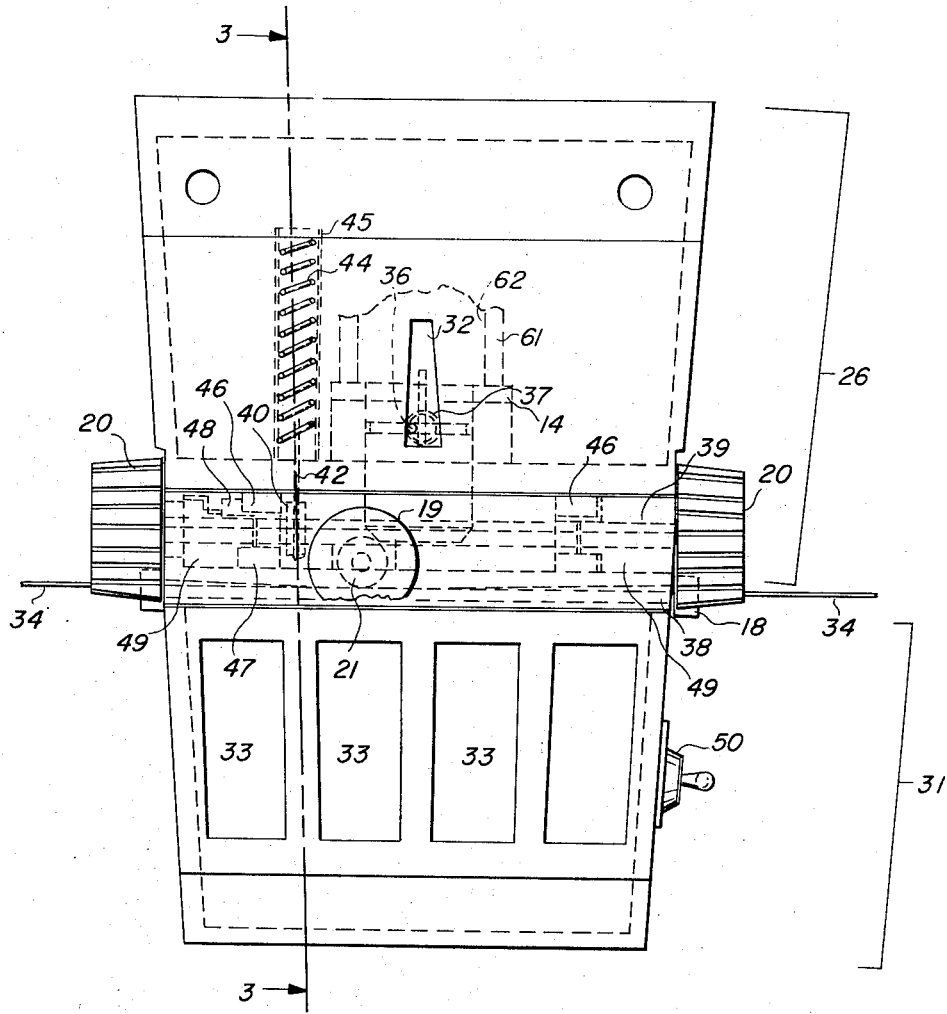
FIG. 2 is a front elevational view of the base module for the viewing apparatus shown in FIG. 1.
Figure 3:
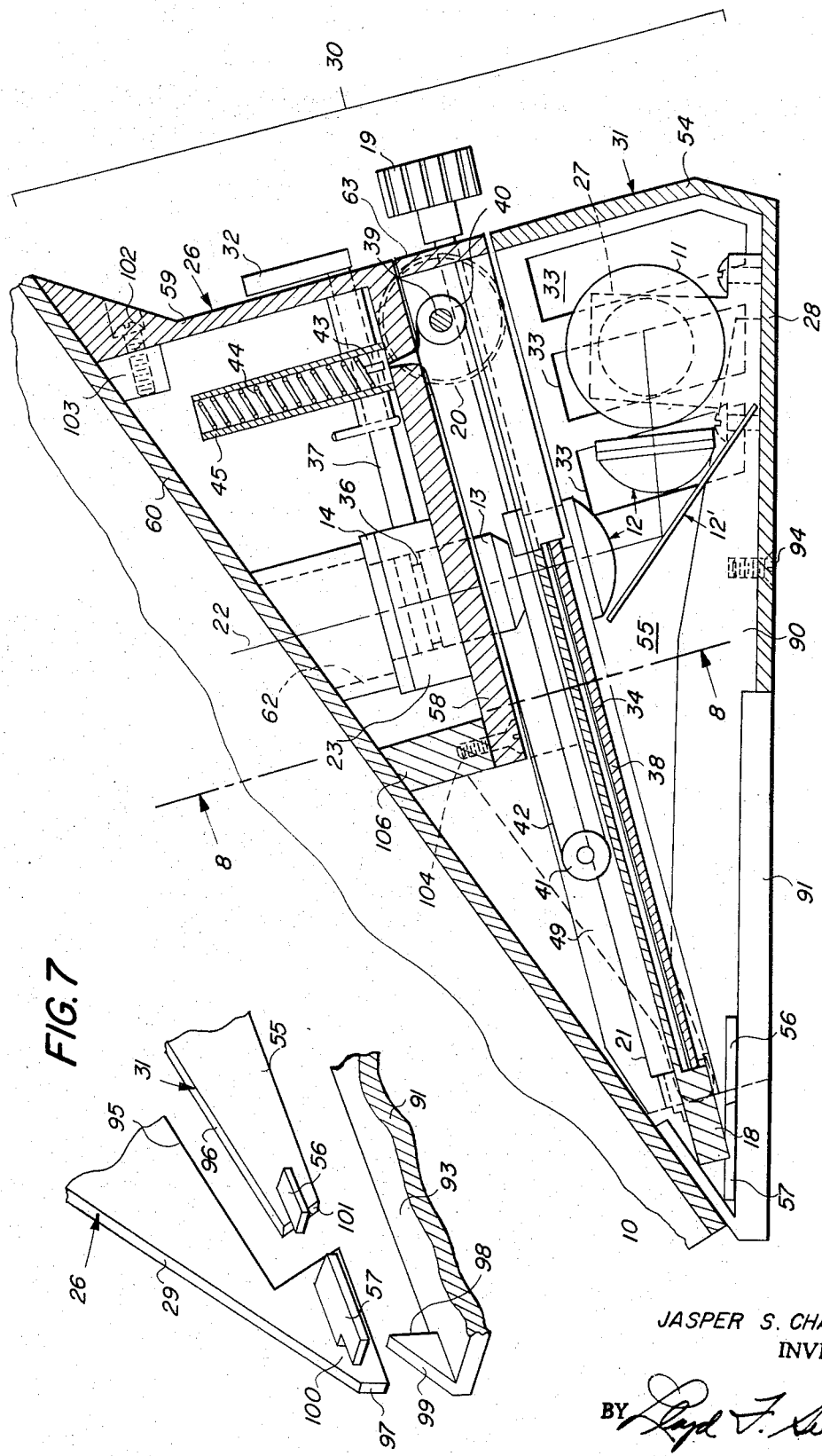
FIG. 3 is a vertical sectional view taken substantially along the line 3—3 in FIG. 2.

Reference is now made to the particular embodiment of the invention as disclosed in FIGS. 1–3. The viewing apparatus 25 comprises a base module or unit 30 and a housing module or unit 10 which is mounted on said base module. In this embodiment of the invention, the base module 30 comprises an illumination section 31 and a medium handling and projecting section 26.

The illumination section 31 is provided with windows or louvers 33, which permit air to circulate around lamp 11 which is mounted on a bracket 27 that is secured in position on the bottom wall 28 of section 31. A condenser lens system 12 is mounted in section 31 with a mirror 12' arranged between the condenser lenses, as shown in FIG. 3. The side walls 55 of section 31 extend from a front wall 54 and are coextensive (when assembled) with side walls 29 of the support section 26. Each of walls 29 and 55 is provided with a projecting lug 55 and 57, respectively, see FIG. 7, the purpose of which will be described hereinafter.

The medium handling and projecting section 26 is provided with a plate or shelf 58 which extends from the front wall 59 as shown in FIG. 3. The projection lens system, generally designated by 13, is contained in the mount 23 that is fixed to plate 58. The lens system per se is movable axially in the mount 23 by means of shaft 37 and lever 32 mounted on the front wall 59. The shaft 37 carries an eccentric pin 36 which engages the projection lens system 13 for moving it axially with respect to its mount, thereby focusing the projected image on screen 16.

Spaced rails 46 and 49 are formed integral with or mounted on the underside of shelf 58 and slideably support a platen 38, which is associated with a carrier generally designated by 18, which carries a photographic medium, such as a microfiche 34. The platen 38 includes a pair of spaced, upright extensions 47 and 48 which have complementary tongues and grooves for slideably engaging rails 46 and 49, respectively. A knob 19 is rotatably mounted in the front wall 63 of platen 38 and carries integral therewith a roller 21 which engages the microfiche 34 for moving it back and forth (arbitrarily the X direction) which is normal to the plane of the drawing, as seen in FIG. 3. The carrier 38 has a pulley 41 rotatably mounted thereon. A cable 42 is wrapped around (1½ times) a small drum 40 mounted on the shaft 39 which carries a knob 20 at each end thereof as seen in FIG. 2. The cable 42 also engages pulley 41 and has both of its ends attached at 43 to spring 44 which is contained in and attached at its upper end to the sleeve 45. With this arrangement, the cable 42 is maintained taut. The spring 44 allows the cable 42 to slip on drum 40 if knobs 20 are turned more than is required to move the platen 38 to either of the extreme positions in the Y direction. The movement of the microfiche 34 in the X and Y directions is accomplished by knobs 19 and 20, respectively. The movement of the microfiche 34 in the X and Y directions so as to position any one of the images in relation to the optical axis 22 for projection onto the screen 16 can be accomplished in other ways, as is well known in the art.

The housing module 10 is of a shape best shown in FIG. 1 with the bottom wall 60 in contact with the side walls 29 of section 26. The housing module 10 is provided with a cylindrical sleeve 61 which provides an image entry opening 62 into module 10. The sleeve 61 extends from the bottom wall 60 toward the mount 23 for projection lens system 13. The extension of sleeve 61 is such that when the housing module 10 is in assembled relation to base module 30 (sections 26 and 31), a soft rubber washer 14 on the mount 32 for lens system 13 is slightly compressed so that a seal is effected therebetween to prevent entry of dust and dirt into housing module 10 from the environs.

The microfiche image that is aligned with the optical axis 22 and projected into housing module 10 via opening 62 is reflected by mirror 15 onto front surface screen 16. A viewing opening 35 in the front wall 63 of housing module 10 permits an observer to view the image projected onto the front surface screen 16. Screen 16 is of the type disclosed in U.S. Pat. No. 3,408,132 and has a high brightness gain on-axis of approximately 40 times.

The housing module 10 is provided with side walls 86 and a top wall 87 which, together with bottom wall 60, extend beyond the filter 17 and terminate with front wall 63. The portions of the walls 60, 63, 86 and 87 which extend beyond filter 17 form a shroud 88. The interior surfaces of the walls forming housing module 10, including these of shroud 88, are preferably blackened to reduce light reflection and to absorb stray light.

The filter 17, as shown in FIG. 1, is planar and is mounted in housing module 10 between the opening 35 and the front surface screen 16. The image in a microfiche 34 that is possitioned relative to optical axis 22 is projected onto screen 16 via lens system 13, opening 62, and mirror 15.

The filter 17 is a 80C blue filter combined with a neutral density filter whose density factor will depend on the light source and the brightness gain of the screen. The filter elements are mounted on a support sheet of transparent acetate for mechanical strength and rigidity or can be combined as integral parts of a suitably formulated plastic sheet. Such a light filter structure will correct for the color temperature of the light source and thereby enhance the image contrast, as well as the luminance of the image. An 80B blue filter can also be used. 80B and 80C designate Wratten filters of the light balancing type. In actual practice, the density factor of the neutral density filter will range from about 0.4 to zero. In the latter case no density filter will be required because of the low light output. For a particular light source operated at less than its rated voltage, the type of light balancing filter and the density factor of the neutral density filter will be chosen so the image reflected from the screen will have optimum illuminance when viewed by an observer.

If the light source is an incandescent lamp, such as an automobile lamp rated at 12.8 volts, and is operated at its rated voltage, the life of the lamp will be about 100 hours. If this same lamp is operated at a reduced voltage of about 11.2 volts, the filament produces a color temperature of about 2,800°K and its life is increased to about 500 hours. With an 80C filter, the color temperature of the lamp can be effectively raised to that of 4,000°K light source on the basis of the black-body locus. As the gain of the screen increases, or if the light output and/or lens speed is increased, a neutral density component will be required whose density factor will also increase to about 0.4 or more in accordance with the other factors. The luminance of the image in clear areas should be approximately 120 foot lamberts for comfortable viewing. A more detailed explanation of filter means 17 with respect to its components, shape and use in conjunction with shroud 88 to reduce ambient light will be found in my copending application Ser. No. 126,215 filed concurrently herewith.

At the extreme viewing angles of about ± b 7½° (horizontally) and about ± 2¼° (vertically) as determined or limited by opening 35, the effective brightness gain of a typical screen is about 30 times. Even higher gain could be accomplished if ideal light distribution could be achieved. The theoretical gain for ideal distribution for these angles is 159 times. The screen curvature is such that at a viewing distance of about 21 inches there is no lack of uniformity of brightness (no hot spotting) over the entire screen. The radius of curvature of the screen is about 17¼ inches, the lens-to-screen distance is about 14⅝ inches. Such a high brightness screen accounts for the desired light output, even though a low wattage bulb and a filter are used, the latter optimizing the luminance of the image reflected by the screen when viewed through the opening.

With the use of a low wattage lamp, for example, a 12 watt lamp, a condenser system 12, 12' as shown in FIG. 3, a $f/3.5$ projection lens and a screen 16 as described and with no filter in such a system, it was found that a brightness of 1,200 foot lamberts was obtainable with an open gate, that is with no film present in the system. This is obviously too high for the physical comfort of the observer. By comparison, a white sheet of paper in a well-illuminated office might reflect a brightness of 100–120 foot lamberts. As a consequence, filter 17 is needed and can serve a number of useful purposes.

Figure 4:
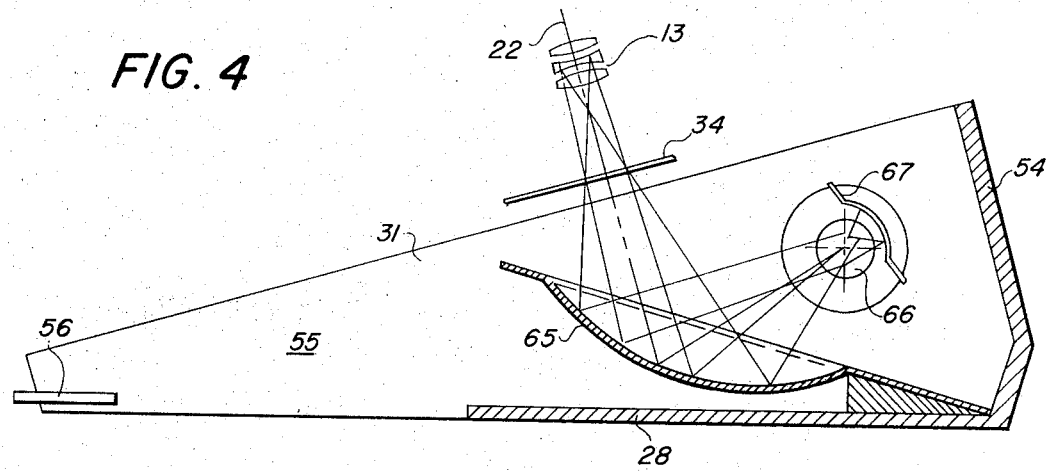
FIG. 4 is a vertical sectional view through a part of the base module showing a reflector member which effectively comprises the condenser lens system for illuminating the photographic medium.

With respect to FIG. 4, a much simpler illumination system is disclosed. In this arrangement the condenser lens 12 and the reflector 12' are replaced by a pressed aluminum, ellipsodial mirror 65 having a reflecting surface that must be formed with extreme accuracy. In this embodiment the lamp 11 can be replaced with a smaller lamp 66 and a separate reflector 67.

Figure 5:
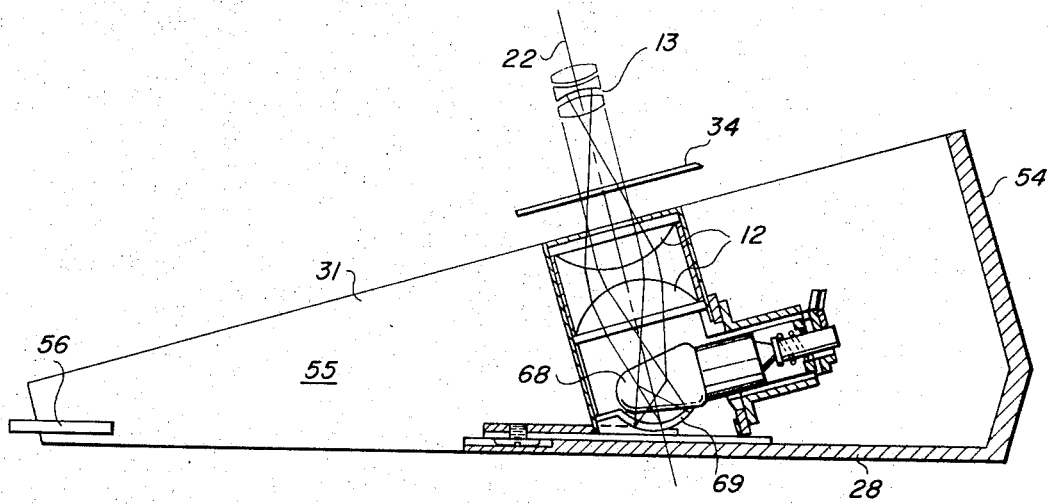
FIG. 5 is a vertical sectional view through a part of the base module of another embodiment in which a condenser lens system is used with a low wattage lamp that is in direct alignment with the condenser lens system.
Figure 8:
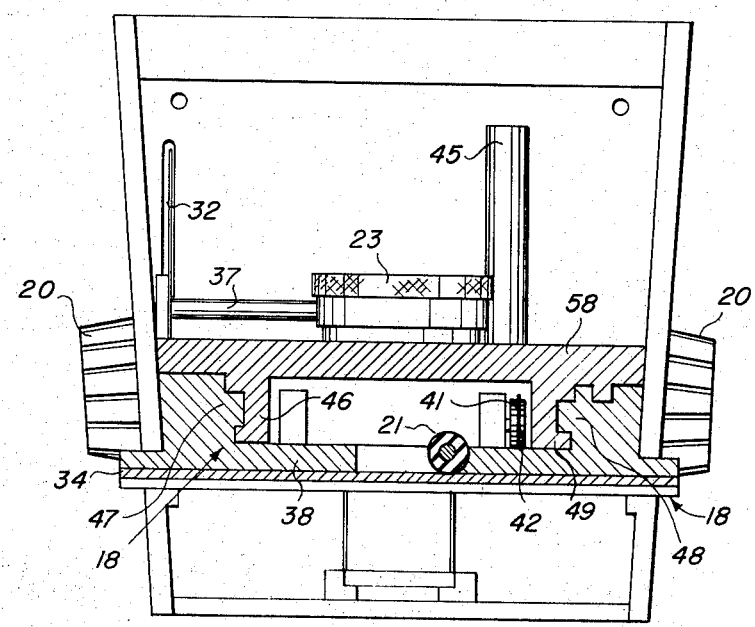
FIG. 8 is a sectional view taken substantially along line 8—8 in FIG. 3 showing in detail an arrangement for moving a microfiche in both an X and Y direction to position a selected image relative to the optical axis of a projection system.

In FIG. 5, a small lamp 68, such as a flashlight lamp, is shown as being used in line with the lenses 12 comprising the condenser lens sytem. With this arrangement, the lamp 68 can be energized with approximately 4½ volts as derived from three C-size dry cells which can be mounted inside section 31. A reflector 69 is used and serves the same purpose as reflector 67 (FIG. 4). These reflectors 67 and 69 nearly double the light incident on screen 16.

With reference to FIG. 6, the housing module 10' is disclosed as being shortened, when compared with FIG. 1, by moving the projection lens system 13 and the condenser lens system 12 together with the microfiche moving mechanism to the left, as viewed in in FIG. 6. This change necessitates making an appropriate change in the angle of mirror 15, whereby the off-axis angle is increased from 11°, as shown in FIG. 1, to 14°, as shown in FIG. 6. The increase in the off-axis angle reduces the distance between screen 16 and mirror 15, and the combination of the shift of the mirror 15 and the optical axis 22 (systems 12 and 13) allows filter 17 to also be moved to the left. The filter is curved, at least at the upper end to permit shortening of the shroud 88.

The manner in which the curvature of the filter 17 affects the shape and size of shroud 88 (the dark zone 51) is disclosed in my above-mentioned co-pending application. With these changes in the housing module, the opening 35 can also be increased to provide more vertical freedom of eye position. An increase of 3° in the off-axis angle improves the rejection of ambient light because the brightest portions of the ambient light reflected from the screen is directed 6° farther away from the opening 35 so that it is absorbed, for the most part, by the black interior walls of the housing module 10'.

Figure 10:
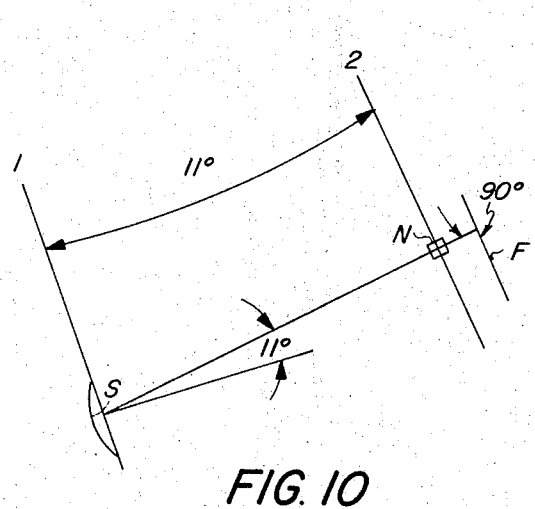
FIGS. 10 and 11 are schematic views showing the relative positions of the projection lens and screen for increasing the rejection of ambient light by the screen.
Figure 11:
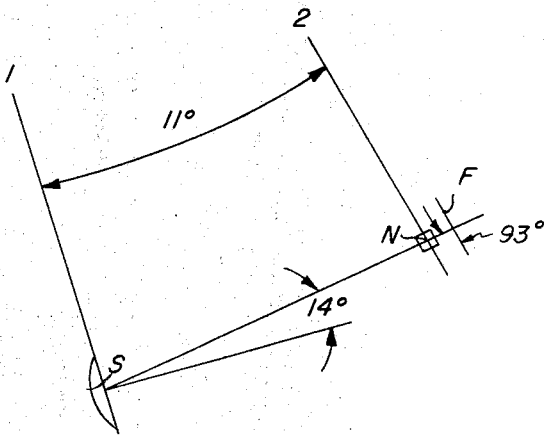

FIGS. 10 and 11 show, to a rather small scale, the location of screen 16, projection lens system 13, and the film plane F relative to one another and without the mirror 15. It is well-known that if a line N-2 is passed through the nodal point N of the projection lens system 13 parallel to the film plane F and is extended ti intersect with a line S-1 which lies in the plane of the screen 16, the lines which are parallel on the photographic medium will form images on the screen which will appear to meet at this same distance intersection point. In FIG. 10 the film plane is chosen to be perpendicular (90°) to the line joining S and N. This represents the embodiment disclosed in FIG. 1 and lines N-2 and S-1 will make an angle of 11° and will meet at a point which is a great distance from the screen. The amount of image "keystone" on the screen, which this angle represents, is less than 3° slope of edge lines relative to the vertical center line of the screen, or about a 9/16 of an inch narrower image at the top of a screen about 6 inches high relative to the width of the image at the bottom of such a screen. This amount of keystone is considered to be acceptable and allows the projection lens 13 to be used on axis. With a 14° off-axis angle, as shown in FIG. 11, the film plane F is at 93° to the line S-N and, as a result, the lines N-2 and S-1 will again form an angle of 11° relative to each other. The amount of image keystone will be exactly the same. For the correct focal plane, however, it is necessary for the lens to have about 2° greater half angle coverage.

With the foreshortening of the housing module 10', sections 26 and 31 can be combined into a single module 70, as shown in FIG. 6, so that modules 10' and 70 are separable. In this case, the side walls 71 of the module 70 are continuous and the edges 73 thereof, which support the housing module 10', have a contour complementary to that of the bottom wall 71 of the housing module. In this arrangement, the microfiche platen or carrier 38 is also mounted for movement in a manner similar to that described above, so that the microfiche 34 can be moved in both X and Y directions by either rotation of suitable knobs or rotation of a single knob for movement in one direction and manually slideable for movement in the other direction. As in the embodiment described above, the housing module 10' is provided with a sleeve 61 which engages the washer 14 on mount 23 so as to provide a seal between the housing module 10' and module 70.

With respect to the viewing apparatus shown in either FIG. 1 or FIG. 6, the platen 38 which carries the microfiche 34 can be replaced with a plate 75 which supports a pair of spaced spindles 76 and 77, as shown in FIG. 9. A suitable gate 78 can be provided so that a film strip 79 of 8, 16 or 35mm width can be moved relative to the optical axis 22 of the viewing apparatus. In this embodiment, the film strip 79 is carried by a reel 80 which is rotatably mounted on the spindle 76. The film strip is threaded under a guide roll 81, under the gate member 78, around another guide roller 82, and to a reel 83 on spindle 77. A suitable knob or driving mechanism can be arranged with resepct to either or both of spindles 76 and 77 so as to move the film strip 79 relative to the aperture 84 in the plate 75 and the aperture 85 in gate member 78. Such a carrier unit for the photographic medium can be readily adapted to the base module 30 disclosed in FIG. 1 or the module 70 disclosed in FIG. 6.

The means for securing the housing module 10 in an assembled relation to the base module 30, which includes sections 26 and 31, comprises a pair of spaced feet 90 which are attached to or formed integral with the bottom wall 60 of housing module 10. The feet 90 are spaced from one another and joined by a plate 91 which, when in an assembled relation, provides an extension and continuation of the bottom wall 28 of the illumination section 31. The projecting lugs 56 on each of side walls 55, see FIG. 7, engage the surface 93 of plate 91, as shown in FIG. 3, with the side walls abutting the edge of said plate. Suitable screws 94 draw the section 31 against feet 90 so the lugs 56 actually bear against plate 91. The lugs 57 extending from side walls 29 also engage the surface 93 of plate 91. In an assembled relation, side walls 29 and 55 are coextensive with the edges 95 and 96 thereof forming an opening through which platen 38 can be moved. The edge 97 of wall 29 aligns with the end of plate 91 and the notch 100 engages extension 99 to prevent any lateral movement of walls 29. Also, the portion of lug 56 extending beyond edge 101 engages wall 29 to prevent any lateral movement of walls 55. The section 26 is maintained in position by screws 102 which secure said section to extending lug 103 and by screws 104 which secure plate 58 to extending lug 106.

With respect to FIG. 6, the mounting means comprises the edge contour of the side walls 71 on unit 70. The several angularly disposed edges 73-1-2-3 of each of side walls 71 form a nook or cradle in which the module 10' is supported, the edges 73 conforming to the contour formed by the bottom wall 60 and rear wall 74 of module 10'. In addition, suitable lugs 107 are provided on walls 71 and bottom wall 60 so that the housing module 10' and unit 70 can be securely joined by suitable means, such as screws 108. When either of the above-described mounting means (FIG. 1 and FIG. 6) are accomplished, the cylindrical sleeve 61 is brought into engagement with the washer 14 to provide the necessary seal between the housing module 10 or 10' and the base module 30 (section 26) or the single unit 70.

It can be readily appreciated that the modular structure of the viewing apparatus described hereinabove is such that various types of base modules and film handling mechanisms can be combined and/or interchanged and easily assembled as a complete unit. Such modular structures also permit the viewing apparatus to be used with most any form of photographic media, for example, microfilm rolls, cassettes, slides, etc. In each instance, high image contrast can be obtained with low wattage light sources so that the need for blowers or glass platens to control the heat and, hence, the film flatness, can be eliminated. Also, with the use of low wattage light sources, the power source can be chosen from any one of flashlight batteries, 12-volt car batteries, or 110-volt light power sources. With the use of a low voltage source, the viewing apparatus is completely portable and independent of any required source of potential.

The invention has been described in detail with particular reference to preferred embodiments thereof, but it will be understood that variations and modifications can be effected within the spirit and scope of the invention.

I claim:

1. Viewing apparatus having an optical axis normal to which a selected one of a plurality of images carried by a photographic medium in the form of either a sheet or a roll is projected onto a front surface screen optically aligned with the axis, comprising:

a housing module having a viewing opening and an image entry opening, and including light filter means optically aligned with the axis and arranged intermediate the screen and the viewing opening and an image reflecting system comprising at least one reflecting member and the screen optically aligned with the axis and arranged between the image entry opening and the filter means;

a base module having an open top which is positioned relative to the image entry opening when the modules are detachably secured as a unit, and comprising a projection lens system optically aligned with the axis and the image entry opening and having a focal plane in and through which a selected form of the medium is movable, first and second means alternately detachably mounted on the base module, the first means supporting and moving a first form of the medium through the focal plane and the second means supporting and moving the other form of the medium through the focal plane, and an illuminating system optically aligned with the axis for illuminating the selected one image that is moved into position relative to the axis; and mounting means associated with each of the housing and the base modules and interacting to releasably secure the modules together as a unit so that the projection and reflecting systems are in optical alignment.

2. Viewing apparatus in accordance with claim 1 wherein the housing module is provided with a bottom wall comprising a number of angularly disposed surfaces, one of which is provided with the image entry opening, and the base module is provided with spaced, parallel side walls having angularly contoured edges for engaging the bottom wall of the housing module to support the latter in an optically aligned relationship with the base module.

3. Viewing apparatus in accordance with claim 1 wherein the illuminating system comprises a light source and an ellipsoidal reflector arranged between the light source and the medium for directing light onto the image positioned in the focal plane and relative to the axis.

4. Viewing apparatus in accordance with claim 1 wherein the first form of the medium is a microfiche having a number of images thereon arranged in both X and Y directions, and the first supporting and moving means is supported on the base module for movement in the focal plane and in both X and Y directions so as to position a selected image on the microfiche relative to the optical axis.

5. Viewing apparatus in accordance with claim 4 wherein the first supporting and moving means is slidably mounted on the base module and moves the microfiche in the focal plane and relative to the optical axis in one of the X and Y directions and is movable as a unit with the microfiche in the other of the X and Y directions.

6. Viewing apparatus in accordance with claim 1 wherein said mounting means comprises a pair of feet spaced from and parallel to each other, extending from a bottom surface of the housing module at an angle toward the image entry opening and engaging a bottom surface of the base module, the feet being joined the ends adjacent the bottom surface of the housing module throughout a portion of their length by a flat section forming a part of the bottom wall of the base module, when the modules are in an assembled relation, and lug members carried by the base module for engaging the flat section to orient the housing and base modules relative to each other in both longitudinal and lateral directions.

7. Viewing apparatus in accordance with claim 6 wherein the base module comprises an illumination section in which the illumination system is arranged, a projection section arranged between the housing module and the illumination section and in which the projection lens system is arranged, and means associated with the housing module and each of the sections for interconnecting and maintaining the same in an assembled relation as a unit.

8. Viewing apparatus in accordance with claim 7 wherein the projection section comprises spaced side walls, a front wall and an intermediate wall extending from the front wall, the latter wall supporting the projection lens system.

9. Viewing apparatus in accordance with claim 8 wherein either the first or the second supporting and moving means is mounted on the intermediate wall for moving the selected form of the medium in at least one direction.

10. Viewing apparatus in accordance with claim 6 wherein the base module comprises spaced, side walls having edges for engaging and supporting the housing module, a front wall and a bottom wall, the edges of the side walls being at an angle to the horizontal for maintaining the viewing opening at an angle from the vertical, and the feet extending into the base module from the vertex end as formed by the edges of the side walls and the bottom wall to position the flat section in a coextensive relation with the bottom wall.

11. Viewing apparatus in accordance with claim 10 wherein the lug members are arranged along and extend from the inner portion of the side walls and the bottom wall for engaging the flat section and maintaining the housing and base modules in an assembled relation without lateral movement.

12. Viewing apparatus in accordance with claim 10 wherein the housing module is provided with a bottom wall comprising at least two angularly disposed surfaces, one of which is provided with the entry opening, and a hollow, cylindrical sleeve extending from the one surface and aligned with the opening. and the base module comprises spaced side walls, the edges of which are contoured to engage the bottom wall of the housing, the sleeve being generally aligned with the optical axis, when the housing module is positioned on the side walls of the base module, and means arranged between and engaging the free end of the sleeve and the projection lens system for effectively sealing the housing module against the entry of dust and dirt from the environs.

* * * * *